United States Patent

[11] 3,590,290

| [72] | Inventors | Gilbert Ruelle;<br>Roger Gillet; Michel Tritsch; Christian Lehuen; Morduch Portnoi, all of Belfort, France |
|---|---|---|
| [21] | Appl. No. | 883,000 |
| [22] | Filed | Dec. 8, 1969 |
| [45] | Patented | June 29, 1971 |
| [73] | Assignee | Societe Generale De Constructions Electriques Et Mecaniques Alsthom Paris, France |
| [32] | Priority | Dec. 23, 1968 |
| [33] | | France |
| [31] | | 180,170 |

[54] COOLING SYSTEMS FOR AMORTISSEUR WINDINGS OF DYNAMO ELECTRIC MACHINES
10 Claims, 3 Drawing Figs.

[52] U.S. Cl. .................................................. 310/54, 310/61
[51] Int. Cl. ...................................................... H02k 9/19
[50] Field of Search ............................................ 310/54—65

[56] References Cited
UNITED STATES PATENTS

| 3,009,072 | 11/1961 | Mossay | 310/57 |
| 3,242,360 | 3/1966 | Carle | 310/54 X |
| 3,458,738 | 7/1969 | Pohl | 310/54 |
| 3,459,979 | 8/1969 | Dickinson | 310/54 |
| 3,480,810 | 11/1969 | Potter | 310/54 |

*Primary Examiner*—D. F. Duggan
*Attorney*—Flynn and Frishauf

ABSTRACT: A fluid reservoir, centrally of a rotating shaft is interconnected with ducts formed in the interior of the amortisseur windings to cool the same by traversing the windings with fluid from the reservoir. The interconnection includes a plurality of turns, coaxial with the machine, for example located at the inside of the fluid reservoir and against the wall thereof, so that upon starting fluid will immediately be forced into the amortisseur windings without outside auxiliary pumps.

PATENTED JUN 29 1971　　　　　　　　　　　　　3,590,290

COOLING SYSTEMS FOR AMORTISSEUR WINDINGS OF DYNAMO ELECTRIC MACHINES

The present invention relates to cooling of windings of dynamo electric machines, and more particularly to cooling the amortisseur windings of synchronous, or asynchronous dynamo electric machines by traversing ducts formed in the windings by a cooling liquid. The invention is specifically directed to automatically cause circulation of fluid upon starting.

Upon starting of asynchronous, or synchronous electric motors, the amortisseur windings heat up rapidly; the heat which is generated in the windings provides energy which depends on the kinetic energy of the machine to be started and the load placed on the machine during starting.

The heat generated in the amortisseur windings during starting may be reduced to a tolerable value by decreasing the load on the machine, even if only by a short time decrease of the countertorque exerted against the motor. If the machine to be started is an alternator utilized as a pumping motor one may, for example, uncouple the machine from the pumping rotor, for example by means of a clutch, or by bypassing fluid to be pumped, or by draining the pump so that the pump impeller will run free. Nevertheless, that portion of the heat due to the kinetic energy of the entire assembly cannot be reduced, and if the rotating parts have high inertia, such as may readily occur in hydraulic power plants using pumped storage, that is in which the dynamo electric machines operate either as turbine-driven generators or as pump motors, the heating of the amortisseur windings may reach intolerable value, so that starting other than asynchronous starting must be resorted to.

It has been proposed already, see for example French Pat. No. 1,500,903, to provide for circulation of liquid in ducts placed inside of the amortisseur windings in order to provide cooling channels, and interconnect these ducts, or cooling channels with a cooling liquid reservoir located in the central region of the rotor, and causing circulation of liquid, upon starting of the machine, between this centrally placed reservoir and the cooling ducts or channels.

In actual operation it has been found that it is very important that circulation of cooling fluid begins immediately upon starting of the machine.

It is an object of the present invention to provide an arrangement in which cooling fluid is circulated within the amortisseur windings of dynamo electric machines immediately upon start of the rotor.

SUBJECT MATTER OF THE PRESENT INVENTION

Briefly, a plurality of turns of cooling fluid ducts are placed interiorly of the central reservoir of the cooling fluid, and concentric with the axis of rotation of the machine. These turns interconnect the reservoir and the ducts, or channels formed in the amortisseur windings. Cooling fluid thus traverses, in series, the plurality of windings and circulation is ensured upon acceleration of the machine. In a preferred form, the turns are placed against the inside wall of the reservoir in one or a plurality of layers.

The cooling ducts formed within the amortisseur windings themselves are connected, on one side, to a liquid distribution manifold and at the other side of the rotor to a liquid collection manifold. Both the liquid collection, as well as the liquid distribution manifolds are formed as a turn, each one being traversed by liquid in the same sense, and supply connections to the distribution, and collection manifolds being effected by openings placed at the same radial position. The distributor and collector manifolds, then, increase the actions of the other turns of the interconnection between these manifolds and the cooling windings themselves, by providing on the one hand, pressure of liquid in the direction towards the amortisseur windings, and an underpressure in the direction of removal of cooling liquid. The total pressure differential is, preferably, the same for each one of the bars of the amortisseur windings.

Due to inertia effects, a pressure differential will immediately appear as soon as the machine starts. This effect may, however, cause insufficient circulation during the entire starting period, and, in accordance with a feature of the invention, therefore, centrifugal action is added to ensure further circulation of the liquid. Centrifugal action, itself, will arise slower than the inertia effect, but will become increasingly important as the machine speeds up. In order to increase the centrifugal action of the liquid, guide vanes are installed at the bottom of the liquid reservoir, and the entrance to the turns is placed adjacent these guide vanes.

The effect of a centrifugal pump thus obtained is temporary and limited to the starting period. If the pumping effect, due to centrifugal force, is to extend, or is to continue at all times during running of the machine, guide and blocking vanes can be installed in the reservoir at the region where the liquid from the channels formed in the starting winding recirculates; the static apparatus prevents rotation of the liquid returning to the reservoir and thus provides for circulation of liquid within the duct system.

The invention will be described by way of example with reference to the accompanying drawings, wherein.

Figure 3:
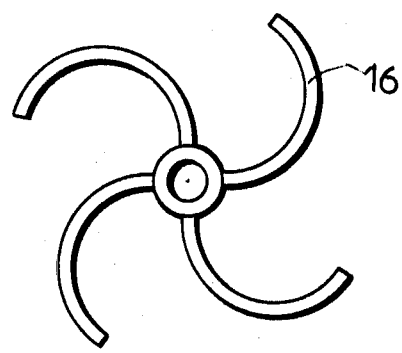

and FIG. 3 is a plan view of the vane arrangement to provide for centrifugal pumping action.

Shaft 1, which may be vertical, is the rotor of a dynamo electric machine. The interior of the rotor is hollowed to form a liquid reservoir 2, located centrally of the shaft. The shaft itself is supported on a thrust bearing, only schematically illustrated by bearing supports 3, as well known in the art.

A magnetic circuit 4 is provided on the rotor, and not further illustrated. This can, in most instances, be an electrical coil. An amortisseur winding is provided, which is also not further illustrated except for the cooling ducts 5 thereof. The entire arrangement is known in the art, and for example as described in the aforementioned French patent. The cooling ducts 5 are interconnected, at one of their ends, to a distribution manifold 6 and at the other ends to a collector manifold 7. The distribution and collector manifolds are toroidal chambers coaxial with the rotor.

A centrifugal pump 8 is located in the lower portion of reservoir 2. This centrifugal pump is in its simplest form only a plurality of vanes secured to the bottom 9 of the reservoir. These vanes may, for example, extend radially, or be shaped as involutes of a circle.

A plurality of turns of ducting 10 is located above the pump 8. These turns 10 are serially connected (with respect to fluid flow) by ducts located in the back of shaft 1, and thus not seen in FIG. 1. They, like the turns 10, are placed against the cylindrical wall 11 of reservoir 2. The lower turn terminates, by a passage not shown, between a pair of helical turns 12 of pump 8. The topmost turn communicates with a duct 13 which is connected to the distribution manifold 6. The collection manifold 7 is connected to the upper part of the reservoir 2 by a duct 14 to return fluid to the reservoir.

Figure 1:
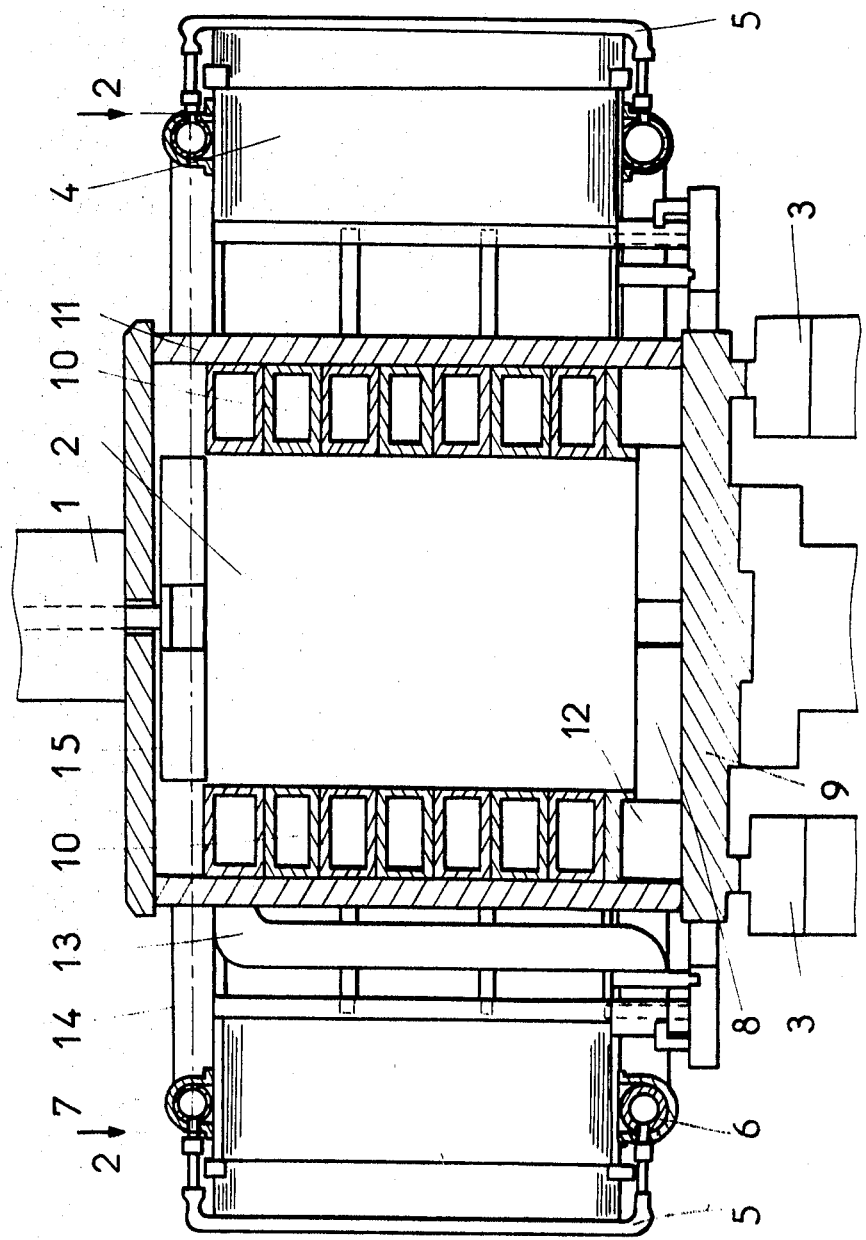
FIG. 1 is a vertical cross-sectional view, in highly schematic form, of a rotor formed in accordance with the present invention, in which conventional parts have been omitted or are shown symbolically only.

The connections illustrated in FIG. 1, between the distribution manifold 6 and the collection manifold 7 on the one hand, and between the reservoir 2 and the turns 10 on the other have the effect that the inertia effect due to the turns 10 has added thereto the centrifugal effect due to pump 8 and, further, thermosyphon action due to the difference in density of liquid which is heated in the amortisseur winding, and cool liquid taken from the reservoir. If the thermosyphon effect is not needed, the distribution manifold 6 may be located at the upper section of the windings, and collector reservoir 7 at the lower portion of the channels 5.

For cooling of amortisseur windings during continued operation of the machine, by pump 8, a group of vanes 15 may be installed at the upper part of the reservoir 2. These vanes 15 may be similar to those of pump 8, for example, but secured to a fixed, nonrotating part of the machine, and not to the rotor itself.

Figure 2:
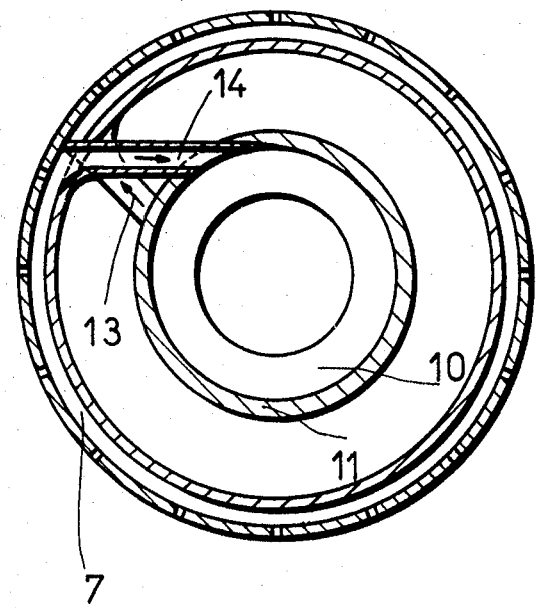
FIG. 2 is a partial cross-sectional view to a different scale along lines 2–2 of FIG. 1.

The ducts 13 and 14 terminate substantially in the same radial position as distributor and collector manifolds 6 and 7, as seen in FIG. 2. The liquid circulates in the manifolds in the same sense, so that the effect of circulation caused by inertia, due to the turns 10 is augmented by an additional turn having a diameter equal to that of the toroidal duct forming the distributor, and collector manifolds; since these manifolds will be of substantial size, a further winding of substantial inertia effect is added to the system.

FIG. 3 illustrates a preferred form of the vanes forming the centrifugal pump 8. These vanes are involutes of circle 16.

Only one layer of turns 10 is shown; more than one layer may be provided, one on top of the other. The optimum number of layers of turns is determined by balancing on the one hand the increased cooling effect due to the larger mass subject to circulation by inertia, against the increased loss due to hydraulic friction in the turns themselves.

The distributor and collector manifolds 6, 7, may themselves be constructed to form short circuit rings of the amortisseur cage.

The invention has been described in connection with the cooling of amortisseur windings of dynamo electric machines; various structural changes and modifications may be made to adapt the inventive concept to specific machines being used.

We claim:

1. Means to cool a rotating amortisseur winding of electrical machines by circulating liquid therethrough comprising
a reservoir of cooling fluid;
cooling ducts formed inside of the amortisseur windings;
a supply manifold connected to one of the ends of said cooling ducts and a removal manifold connected to the other end of said cooling ducts;
and interconnections between said supply and removal manifolds and said reservoir,
said manifolds being formed as a turn coaxial with the rotor of the machine, each, in which liquid circulates in the same sense,
the supply and removal interconnections for liquid from the respective manifolds including terminations of said interconnections at the respective manifold at a similar radial position.

2. Means according to claim 1 wherein said manifolds form short circuit rings of the amortisseur cage.

3. Means according to claim 1 including interconnections between said cooling ducts and said windings, wherein said interconnections are formed with a plurality of turns, coaxial with the axis of the rotor of the machine and serially traversed by the cooling fluid in its path between the reservoir and the ducts in the winding upon change in rate of rotation of said winding.

4. Means according to claim 3, wherein said turns in the interconnections are located in the interior of said reservoir and placed adjacent the walls thereof.

5. Means according to claim 3, including guide vanes located inside of the reservoir and rotating with the machine, and a connection opening to said turns of the interconnections located close to said vanes.

6. Means according to claim 3, including guide vanes located to be stationary with respect to the rotor of the machine, said guide vanes being located adjacent an opening formed in said interconnections between said cooling ducts and said reservoir.

7. Means according to claim 5, wherein said guide vanes are shaped in the involute of a circle.

8. Means according to claim 5, wherein said guide vanes are radially disposed.

9. Means according to claim 3, wherein said turns are formed as full rings, serially interconnected with respect to the path of circulating fluid.

10. Means according to claim 3, wherein the machine has a vertical shaft, the inlet to said turns is located near the bottom of the reservoir, said turns being serially connected to provide for passage of the fluid in said reservoir upwardly; and said interconnections include a supply manifold located at the bottom of said cooling ducts, said interconnections extending from the topmost turn to said supply manifold; an outlet manifold is provided at the upper points of said ducts;
and the interconnections include a connection duct from said outlet manifold to said reservoir whereby, upon heating of said amortisseur windings, additional circulation of fluid will be caused due to thermosyphon action.